United States Patent [19]

Moriarty et al.

[11] 4,432,143
[45] Feb. 21, 1984

[54] WELL LOGGING APPARATUS

[75] Inventors: Keith A. Moriarty; Lowell R. Milligan, both of Houston, Tex.

[73] Assignee: Dresser Industries, Inc., Dallas, Tex.

[21] Appl. No.: 360,747

[22] Filed: Mar. 22, 1982

[51] Int. Cl.³ ............................ G01B 7/12; G01V 5/00
[52] U.S. Cl. ...................................... 33/178 F; 250/268
[58] Field of Search ........................ 33/178 E, 178 F; 166/241; 250/268; 367/35, 86, 911

[56] References Cited

U.S. PATENT DOCUMENTS

| | | | |
|---|---|---|---|
| 2,812,587 | 11/1957 | Roussin | 33/178 |
| 2,876,413 | 3/1959 | Saurenman et al. | 324/10 |
| 2,899,633 | 8/1959 | Smith et al. | 33/178 F |
| 2,994,962 | 8/1961 | Lebourg | 33/178 F |
| 3,177,938 | 4/1965 | Roussin | 33/178 F |
| 3,254,221 | 5/1966 | Saurenman | 250/83.6 |
| 3,356,146 | 12/1967 | Anderson | 166/241 |
| 3,423,671 | 1/1969 | Vezin | 324/1 |
| 3,566,682 | 3/1971 | Winkler, Jr. | 250/268 |
| 3,617,746 | 11/1971 | Janssen et al. | 250/268 |
| 4,120,353 | 10/1978 | Roesner | 166/65 R |
| 4,243,099 | 1/1981 | Rodgers | 33/178 F |

FOREIGN PATENT DOCUMENTS 200536 10/1967 U.S.S.R. ............................ 33/178 F

Primary Examiner—Richard R. Stearns
Attorney, Agent, or Firm—Richard M. Byron; Patrick H. McCollum

[57] ABSTRACT

An elongated body member having a plurality of crank arms pivotally attached thereto, such crank arms disposed generally symmetrically around the perimeter of the body member. At a first end of each crank arm is a contact pad for maintaining substantial contact with the sidewalls of a borehole. The second end of each crank arm is pivotally coupled to a drive link which is in turn attached to a piston which is longitudinally slidably mounted within the body member. Longitudinal movement of the piston within the body member will result in a corresponding generally lateral movement, either extension or retraction, of the crank arms and thereby of the contact pads attached thereto. A mechanism is provided for allowing the piston to traverse a limited range of longitudinal movement within the body member, a force being exerted upon the piston such that the piston is urged to the bound of such travel which will yield the maximum lateral extension of the contact pads. This mechanism is also capable of retracting the contact pads within the general confines of the body member. A mechanism is also provided for determining the longitudinal position of the piston within the body member and for thereby obtaining a functional indication of the diameter of the borehole.

9 Claims, 12 Drawing Figures

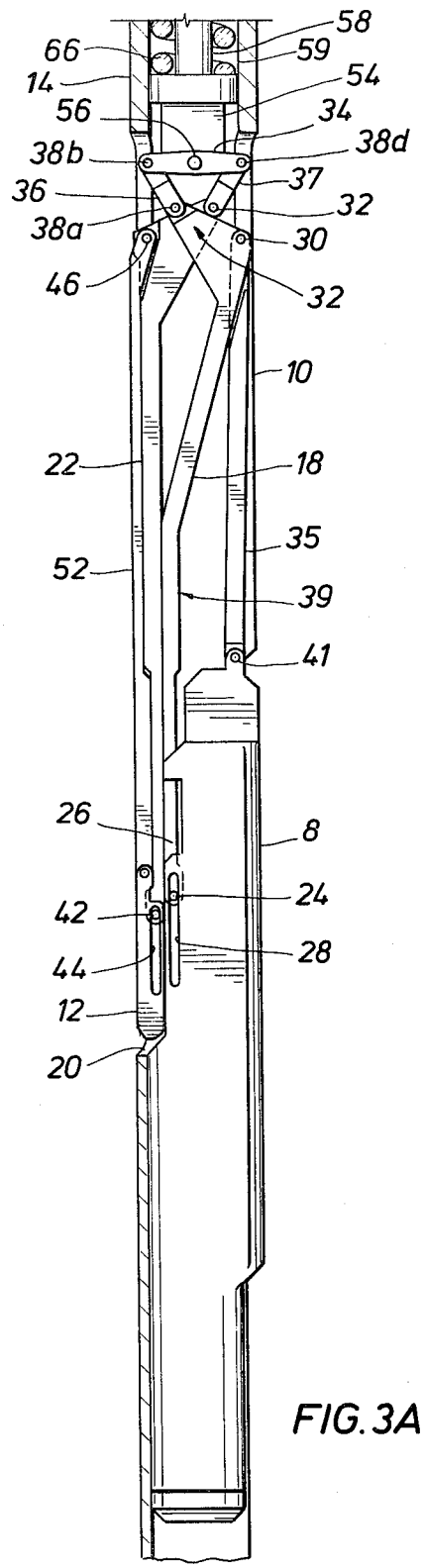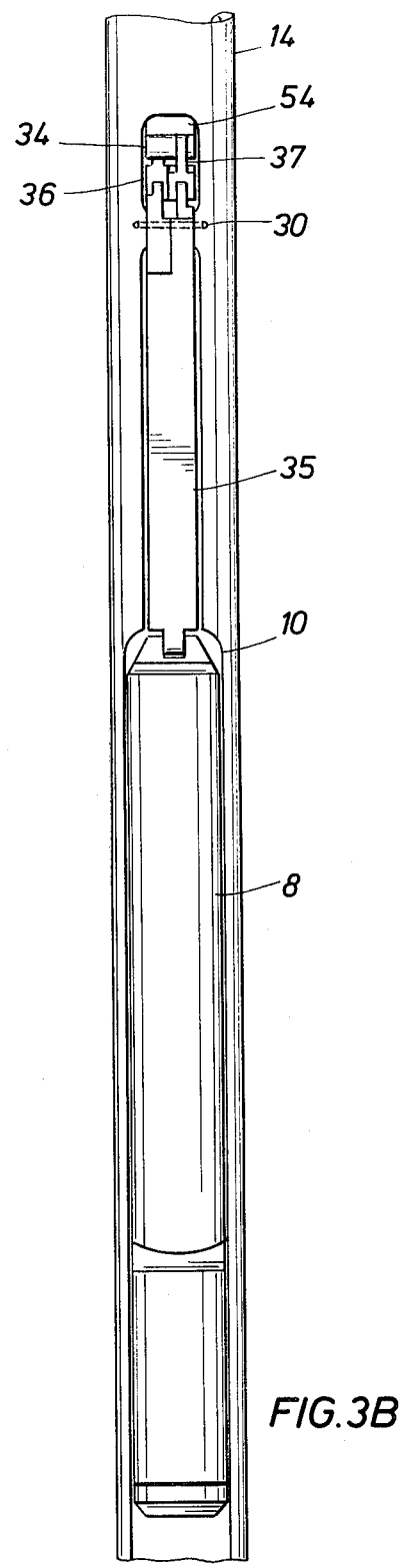
FIG.3A
FIG.3B

WELL LOGGING APPARATUS
>
> ## BACKGROUND OF THE INVENTION
>
> This invention relates generally to apparatus for well logging and more specifically to apparatus for maintaining a plurality of borehole-contacting pads in general contact with the sidewalls of a borehole and for functionally determining the diameter of such borehole.
>
> In many types of well logging operations, during traversal of the borehole, it is desirable to maintain some portion of a logging instrument such as one or more contact members in generally constant contact with the sidewalls of the borehole, not withstanding anomalies or washouts in the surface of the sidewalls of such borehole. In certain logging operations these contact members may be contact pads which may also contain apparatus facilitating the performance of the logging operation. It is also desirable in many of these logging operations to measure the diameter of the borehole throughout the logging operation, including the borehole diameter as the aforementioned sidewall anomalies or washouts occur. It is further desirable in some of these same logging operations to maintain an attached string of additional logging instruments positioned against the general contour of the borehole sidewall.
>
> The prior art has attempted to achieve one or more of these desired goals by utilizing a variety of logging instrument designs. One such design is the "fixed pad" design of a logging device, such as for a logging device often used for density logging operations, wherein a borehole-contacting logging pad containing logging apparatus is pinned, or in some other way fixed, in a slightly laterally extended position relative to the body of the logging instrument prior to insertion of the logging instrument into the well. Diametrically opposing the logging pad, relative to the body member of the logging instrument, is a widely extendable, generally radially moving, decentralizing arm and an attached pressure pad which serve to keep the body of the logging instrument generally decentralized relative to the longitudinal axis of the borehole and to keep the logging pad held against the borehole sidewall. With this fixed pad design the logging pad is subject to considerable wear as it is in generally constant contact with the borehole sidewall as the instrument travels both into and out of the well. Additionally, because the pad is fixed in place it is not capable of maintaining contact with the borehole sidewall throughout a washout in the sidewall if such washout is of a dimension greater than the fixed extension of the pad. Similarly, where there is no washout in the borehole, the pad will act to hold the body member of the logging instrument and, in turn, any other instruments attached to the body member, out of contact with the borehole sidewall.
>
> One attempt to avoid some of the disadvantages of the fixed pad design has been to utilize an alternative design incorporating a hydro-mechanical mechanism to laterally extend the logging pad, as well as the pressure pad after the logging instrument has been placed in the borehole. In addition to disadvantages due to the complexity of a hydraulic system, in design configurations wherein the movement of the logging pad is restricted to a slight lateral extension similar to that utilized with the fixed pad, there is again a limitation on the extent to which borehole sidewall contact may be simultaneously maintained by both the logging pad and the instrument. A hydro-mechanical mechanism has also been utilized in configurations designed to widely extend both the logging pad and the decentralizing arm in unison away from the logging instrument in an attempt to facilitate a greater range of extension for the logging pad so as to promote the maintaining of the logging pad in constant with the borehole sidewalls. This design, while allowing the logging pad to maintain contact with the borehole sidewall, does not facilitate the positioning of the body member of the instrument and any attached string of logging instruments against the sidewall of the borehole, but rather serves to maintain the body member of the instrument generally centralized along the longitudinal axis of the borehole.
>
> The present invention overcomes the deficiencies of the prior art by providing a mechanism by which a plurality of borehole-contacting pads of a logging instrument may freely follow the contours of the sidewalls of a borehole, independent of the relative position of the body member of the logging instrument within the borehole, and, by which an indication may be provided of the diameter of the borehole across such pads.
>
> ## SUMMARY OF THE INVENTION
>
> A logging instrument for use in a borehole including a body member and a plurality of borehole contacting pads, each pad capable of moving and independently in a generally lateral direction relative to the body member and also capable of pivoting relative to the longitudinal axis of the body member in order to maintain contact with the borehole sidewalls, and, the logging instrument providing an apparatus by which the diameter of the borehole may be functionally determined. In a preferred embodiment of the invention, the logging device includes two borehole-contacting pads, each contact pad connected to an individual crank arm, proximate one end of the crank arm, the fulcrums of the crank arms being pivotally attached to the body member. The opposite ends of the crank arms are then suitably coupled to alternate ends of a drive link. The drive link is attached proximate its midpoint to a piston which is longitudinally slidable within the body member of the instrument. A drive mechanism is incorporated within the instrument whereby the piston may be moved longitudinally within the body member such that the piston, acting through the drive link, rotates the crank arms in such a manner as to laterally extend the contact pads relative to the body member until the pads contact the borehole sidewalls. A retraction mechanism is also provided whereby the piston may be moved longitudinally so as to cause the drive link to act upon the crank arms so as to retract the contact pads generally within the body member. When the retraction mechanism is released and the drive mechanism is acting upon the piston, the longitudinal position of the piston within the body member is determined by the degree of lateral extension allowed between the contact pads, such lateral extension being limited by the diameter of the borehole across the contact pads. Where the drive link is pivotally attached to the piston, each crank arm and contact pad is free to move independently of the other crank arm and contact pad to allow the contact pads to follow the contours of the borehole sidewalls. Further, any movement of one or both contact pads which causes a change in the lateral extension between the contact pads will be reflected in a corresponding longitudinal movement of the piston within the body member. A signalling device is contained within the body member and is suitably coupled to indicate the longitudinal position of the piston relative to the body member and to thereby provide functional indication of the diameter of the borehole.

Accordingly, it is a feature of the present invention to provide a new and improved apparatus for maintaining two borehole-contacting pads in contact with the sidewalls of a borehole and for simultaneously providing an indication of the diameter of the borehole.

BRIEF DESCRIPTION OF THE DRAWINGS

FIGS. 3 A-B illustrate two side views, at 90° rotation from one another, of the crank arm linkage of the logging instrument of FIG. 2, shown partially in cross-section.

DETAILED DESCRIPTION OF THE PREFERRED EMBODIMENT

Figure 1A:
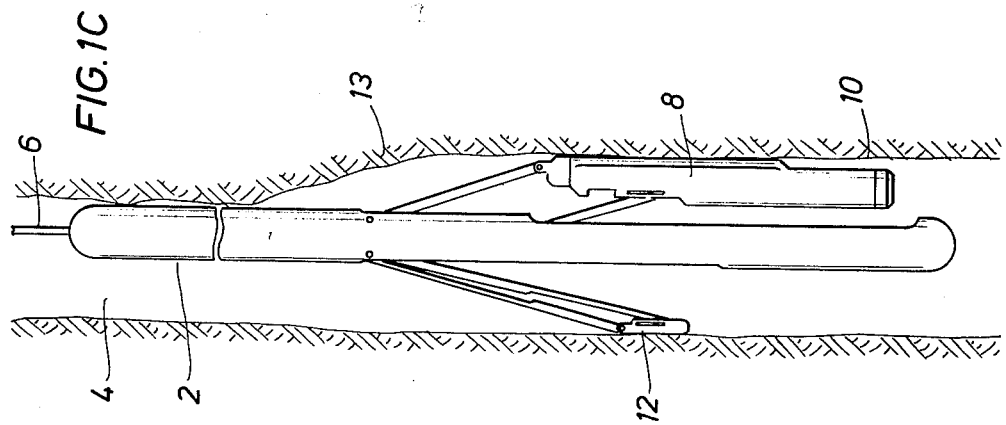
FIGS. 1 A-C contain three views, each shown partially in cross-section, of a logging instrument incorporating the independent arm mechanism of the present invention disposed within an earth borehole, such borehole exhibiting a variety of contours of the borehole sidewalls.
Figure 1B:
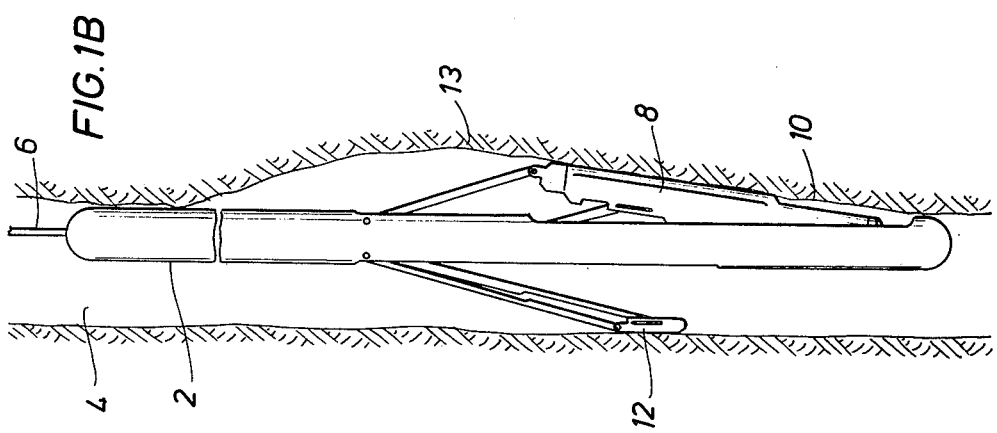
Figure 1C:
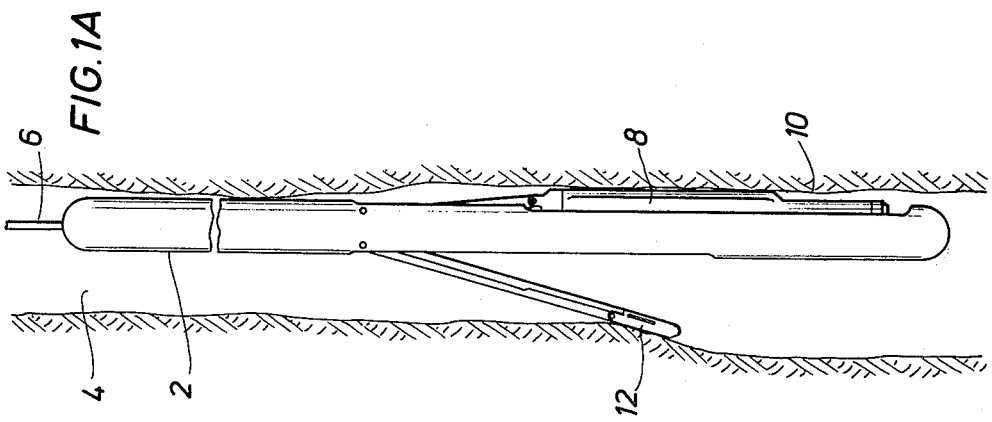

Referring now to the drawings in more detail, particularly to FIGS. 1 A-C, therein is shown, in several views, a logging instrument 2 incorporating the independent arm mechanism of the present invention, disposed within an earth borehole 4, illustrated in vertical section, such borehole 4 exhibiting a plurality of anomalies in the contour of borehole sidewalls 10. Equivalent elements in the three views have been numbered similarly. Logging instrument 2 is suspended within borehole 4 from a cable 6 which is attached to a hoist (not illustrated) at the earth's surface, in a manner known to the art. An integral part of logging instrument 2 is a plurality of contact pads for contacting sidewalls 10 of borehole 4, preferably two such contact pads 8 and 12, disposed generally diametrically opposite each other relative to the main body of instrument 2. At least one of borehole contacting pads 8 or 12, hereinafter designated logging pad 8, may contain components facilitating the obtaining of data concerning borehole 4 or the formations surrounding borehole 4 and for generating signals representative of such data and for which data obtainment it is optimal to maintain logging pad 8 in generally constant contact with borehole sidewalls 10. As an example, in a conventional density logging operation, logging pad 8 would contain the source of gamma radiation and the two detectors of such radiation as are commonly utilized by the industry in such an operation. It is to be understood that when one or more of contact pads 8 and 12 incorporates such signal generating components, an apparatus will be required for communicating such signals from logging pad 8 to signal responsive apparatus within the main body of instrument 2. For clarity, such apparatus are not illustrated here as they are well known and conventional in the art.

Instrument 2 is shown decentralized against the general contour of borehole sidewall 10 through the action of the opposite contact pad, hereinfter designated pressure pad 12, while logging pad 8 is allowed to follow washouts or anomalies, generally illustrated at 13, in borehole sidewall 10. This decentralization is accomplished through an imbalance between the net extension force exerted on logging pad 8 and the net extension force exerted on pressure pad 12, the force exerted upon pressure pad 12 being the greater so as to overcome the resistance exerted against the movement of the body of instrument 2 by logging pad 8. In an alternative embodiment, the forces exerted upon the two pads may be substantially equal so as to facilitate the conducting of a logging operation with instrument 2 centralized within borehole 4. This adaptation for conducting centralized logging operations will be discussed in more detail later herein.

Figure 2A:
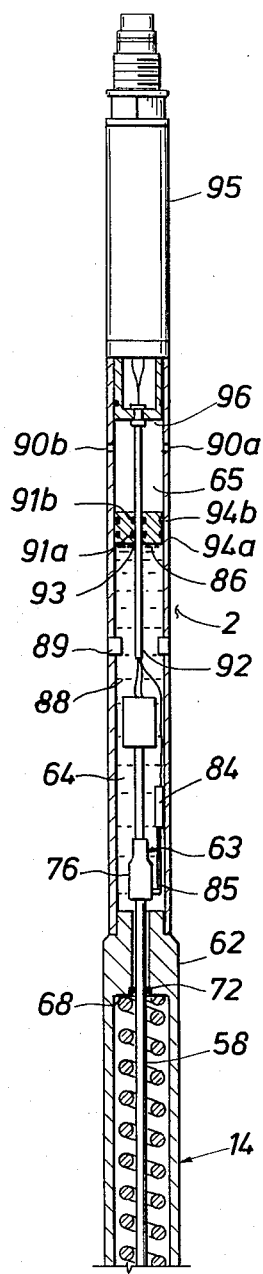
FIGS. 2 A-B illustrate a side view, partially in cross-section, of the logging instrument of FIG. 1.
Figure 2B:
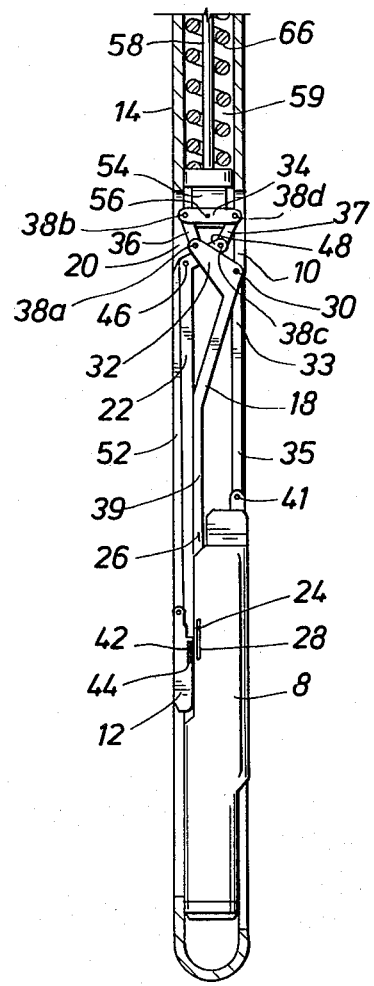

Referring now to FIGS. 2 A-B and 3 A-B of the drawings, therein in FIGS. 2 A-B is illustrated the logging instrument 2 of FIGS. 1 A-C, shown partially in cross-section and with logging pad 8 and pressure pad 12 retracted within instrument 2, while in FIGS. 3 A-B, therein is illustrated the linkage portion of logging instrument 2 of FIGS. 2 A-B, shown in rotatably offset side views and partially in cross-section. Instrument 2 includes an elongated body member 14 which is adapted to traverse an earth borehole. Located within body member 14 is a first recess 10 of generally longitudinal form, contoured so as to allow the retraction of logging pad 8 and attached logging pad crank arm 18 within the confines of body member 14 and to allow their generally lateral extension to the exterior of body member 14 (as illustrated in FIGS. 1 A-C). Also located within body member 14, generally diametrically opposite first recess 10, is a second recess 20 of generally longitudinal form, contoured so as to allow similar retraction and extension of pressure pad 12 and attached pressure pad crank arm 22 relative to body member 14.

Logging pad 8 is pivotally and slidably attached to a first end 26 of logging pad crank arm 18, preferably by a guide pin 24 within a follower channel 28 incorporated into or attached to logging pad 8, such follower channel 28 preferably incorporated intermediate the ends of logging pad 8. Fulcrum 30 of logging pad crank arm 18 is pivotally attached to body member 14. Second end 32 of logging pad crank arm 18 is mechanically coupled to a first end of drive link 34 by means of coupling link 36 which is pivotally attached at alternate ends to second end 32 of logging pad crank arm 18 and to the first end of drive link 34 by means of pivot pins 38a and 38a. In the preferred embodiment of the invention, wherein the design of logging pad 8 makes such desirable, extending arm 39 of logging pad crank arm 18, ie, that arm between fulcrum 30 and first end 26, is formed with an obtuse angle of such degree as to facilitate the retraction of logging pad crank arm 18 and attached logging pad 8 into the confines of body member 14. Also connected between logging pad 8 and fulcrum 30 is logging pad support arm 35. Logging pad support arm 35 is an essentially linear member having a first end pivotally attached to logging pad 8, preferably proximate the top of logging pad 8, preferably by a pivot pin 41, and a second end which is pivotally attached to body member 14 at fulcrum 30. The described connections of logging pad 8 to logging pad crank arm 18 and to logging pad support arm 35 are designed to allow logging pad 8 to pivot over a predetermined range within a plane radial to body member 14 and away from an axis parallel to that of body member 14 so as to allow logging pad 8 to maintain optimal contact with borehole sidewall 10, in the manner illustrated in FIGS. 1 A-C.

Pressure pad 12 is pivotally and slidably mounted to a first end of pressure pad crank arm 22, again preferably by a guide pin 42 within a follower channel 44 incorporated intermediate the ends of pressure pad 12. Fulcrum 46 of pressure pad crank arm 22 is pivotally attached to body member 14 generally diametrically opposite fulcrum 30 of logging pad crank arm 18. The second end of pressure pad crank arm 22 is mechanically coupled to a second end of drive link 34 through coupling link 37, which is pivotally attached at alternate ends to the second end of pressure pad crank arm 22 and to the second end of drive link 34 by pivot pins 38c and 38d. Also attached to pressure pad 12 is pressure pad support arm 52. Pressure pad support arm 52 is an essentially linear member having its first end pivotally attached to pressure pad 12, preferably proximate the top of pressure pad 12, and its second end pivotally attached to body member 14 at fulcrum 46. It is to be appreciated that the described connections of pressure pad crank arm 22 and pressure pad support arm 52 to pressure pad 12 allow pressure pad 12 to pivot axially within a plane radial to body member 14 in a manner similar to that described earlier herein for logging pad 8. It is to be further appreciated that the movement of pressure pad 12 within this radial plane is fully independent of the pivotal movement of logging pad 8 within its described radial plane.

In one embodiment of the present invention, drive link 34 is pivotally attached proximate its midpoint to piston 54 by a pivot pin 56. Piston 54 is longitudinally slidable within a cavity 59 located within body member 14. The end of cavity 59 is defined by a bulkhead 62. A spring 66 is located within cavity 59 and is adapted to bias said piston within cavity 59 toward the distal end of body member 14. Attached to piston 54, and traversing through cavity 59 and bulkhead 62, is pull rod 58 which culminates at retraction mechanism 63 which is located in chamber 64 within body member 14. Retraction mechanism 63, which allows longitudinal travel of pull rod 58 and piston 54, will be described more fully later herein. Pull rod 58 traverses bulkhead 62 through aperture 68 in which an occlusive seal is provided around pull rod 58 by an o-ring 72 installed in a conventional manner within aperture 68. This occlusive seal isolates the apparatus within chamber 64 from the borehole environment.

Located within chamber 64 is a signalling device such as a potentiometer, linear motion transformer, flux gate, or other suitable device for generating a signal representative of any significant longitudinal movement of pull rod 58. In the preferred embodiment this signalling device is a potentiometer 84 of the sliding adjustment type which is suitably coupled to pull rod 58 by potentiometer linkage 85 such that any significant movement in pull rod 58 may be reflected both in occurrence and degree in a corresponding electrical signal.

Instrument 2 includes an apparatus for equalizing pressure between chamber 64 and borehole 4, this pressure equalization eliminating the differential pressure across o-ring 72, thus improving the sealing around pull rod 58 without inhibiting the movement of pull rod 58 through aperture 68. In the preferred embodiment, chamber 64 is defined at one end by a pressure bulkhead 86 which is adapted to move longitudinally within body member 14 while maintaining an occlusive seal therewith, preferably by means of at least two o-rings 94a, 94b, utilized in a conventional manner. Chamber 64 is filled with a suitable fluid, preferably a non-compressable, non-electrically conductive fluid, most preferably hydraulic fluid 88. Another chamber 65 is located within body member 14 on the opposite side of pressure bulkhead 86 from chamber 64. Chamber 65 is placed in fluid communication with borehole 4 by ports 90a, 90b. When instrument 2 is placed in borehole 4, the borehole fluid will flow through ports 90a and 90b and enter chamber 65. As the hydrostatic pressure of the borehole fluid increases and acts upon pressure bulkhead 86, bulkhead 86 moves into chamber 64, compressing hydraulic fluid 88 until the hydrostatic pressure of hydraulic fluid 88 matches that of the borehole fluid and the forces exerted upon pressure bulkhead 86 are at equilibrium. The preferred embodiment of the invention contains a stop 89 to limit the movement of pressure bulkhead 86 into chamber 64. It will be appreciated that dependent upon design configurations and borehole pressure, the travel of pressure bulkhead 86 into chamber 64 may be restricted by stop 89 before the described equilibrium is achieved.

In the preferred embodiment, a conduit 92 traverses longitudinally through chamber 65, passing through an aperture 93 in pressure bulkhead 86 to terminate in chamber 64. Contained within this conduit are electrical signal-carrying wires for controlling retracting mechanism 63 and for carrying such electrical signals as are required for the logging operation. It will be appreciated that an occlusive seal is also provided between conduit 92 and pressure bulkhead 86, again preferably by o-rings 91a and 91b conventionally installed within aperture 93. Also contained within body member 14 and isolated from the borehole environment by a bulkhead 96 is electronics section 95 containing such electronic circuitry as necessary for the logging operation being conducted.

Figure 4A:
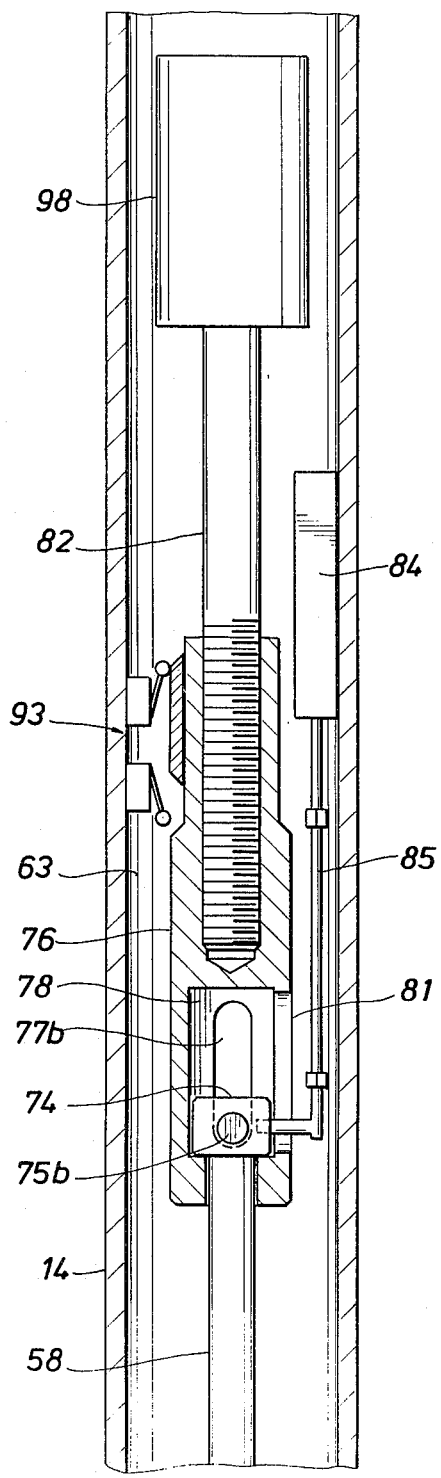
FIGS. 4 A-B illustrate two side views, at 90° rotation from one another, of the retraction mechanism of the logging instrument of FIG. 2, shown partially in cross-section.
Figure 4B:
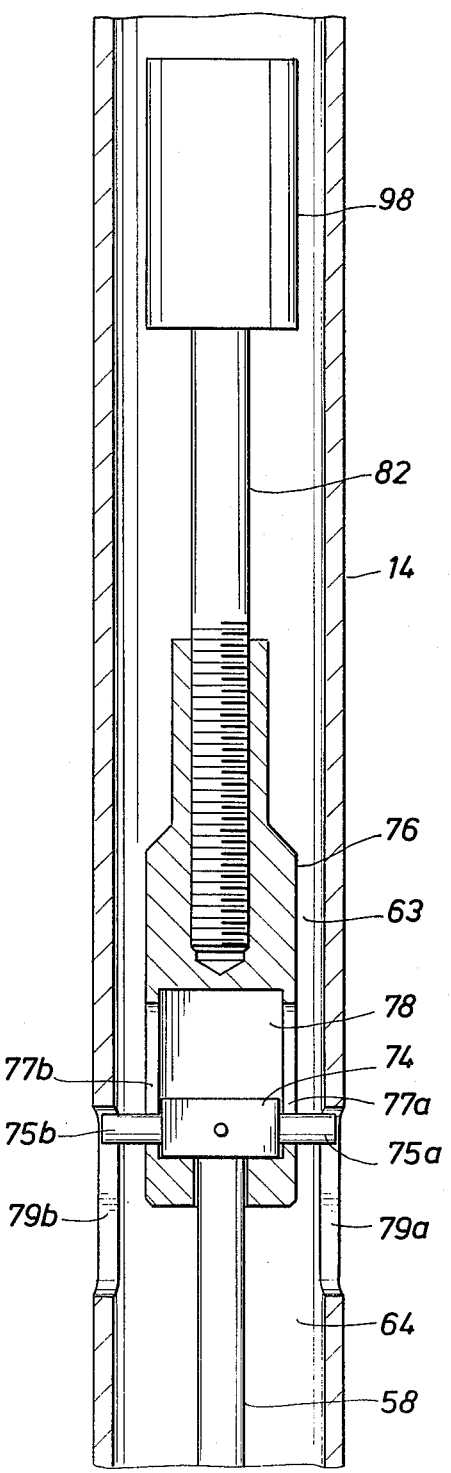
Figure 5:
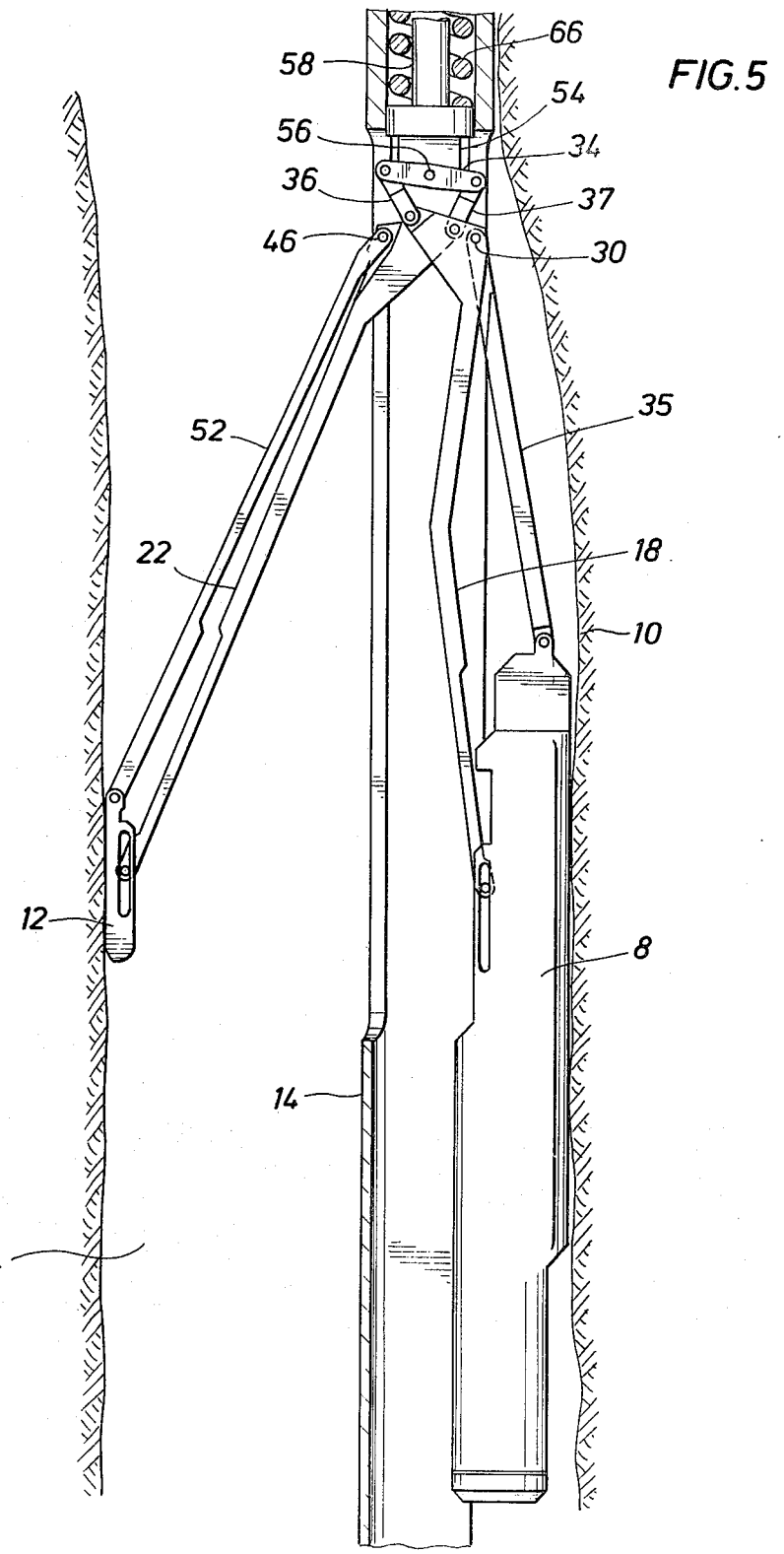
FIG. 5 illustrates in greater detail the crank arm linkage of the instrument of FIG. 2 as the pressure pad acts to position the body member against the borehole sidewall while allowing the logging pad to follow an anomaly in the contour of the borehole sidewall.

Referring now to FIGS. 4 A–B of the drawings, therein is illustrated, in two rotatably offset views, retraction mechanism 63 of the preferred embodiment of the present invention in greater detail. Attached to the upper end of pull rod 58 by suitable means is a shoulder 74 which is held within, and is free to longitudinally traverse, a cavity 78 in traveling block 76. Integrated with shoulder 74 are guide pins 75a and 75b which engage and are slidable within apertures 77a and 77b in traveling block 76 and apertures 79a and 79b in body member 14. Traveling block 76 contains another aperture 81 surrounding potentiometer linkage 85 to facilitate the longitudinal movement of pull rod 58. In the preferred embodiment, a portion of traveling block 76 is adapted to cooperatively engage a drive screw 82, which is coupled to a gear motor 98 suitably adapted to rotate drive screw 82 and to thereby move traveling block 76 longitudinally for a limited distance within body member 14. It will be appreciated that the engagement of guide pins 75a and 75b with apertures 77a and 77b in traveling block 76 and apertures 79a and 79b in body member 14 prevents the rotation of travelling block 76 within body member 14 as drive screw 82 is rotated, thereby facilitating the described longitudinal movement of travelling block 76. The parameters of this movement are prescribed by a suitable limitation mechanism 93, preferably a conventional electrical switch mechanism wherein one switch of a pair of switches is adapted to be activated as traveling block 76 reaches each of the desired bounds of longitudinal movement and upon such activation to decouple electrical powwer to motor 98, causing motor 98 to cease operation.

Referring to the FIGS. generally, in the normal operation of a logging instrument utilizing the independent arm mechanism of the present invention, instrument 2 is lowered into borehole 4 with contact pads 8 and 12 generally retracted within body member 14, as illustrated in FIGS. 2 and 3. When instrument 2 reaches the depth at which the logging operation is desired to begin, a first command signal is generated by electronic circuitry (not illustrated) located at the earth's surface and is communicated through electrical conductors within cable 6 to instrument 2. The command signal activates gear motor 98 which rotates drive screw 82 causing it to move traveling 76 block toward the distal or lower end of body member 14 for a prescribed distance as established by limitation mechanism 93 as discussed earlier herein. Optimally, at the most distant extension of traveling block 76 toward the distal end of body member 14, cavity 78 and apertures 77a and 77b in traveling block 76 are positioned in longitudinal registration with apertures 79a and 79b in body member 14. This registration allows the longitudinal movement of pull-rod 58 toward the proximal end of body member 14 for such a distance as is allowed by the longitudinal coincidence of the dimensions of cavity 78, traveling block apertures 77a and 77b and body member apertures 79a, 79b. In the preferred embodiment these dimensions are such that pull rod 58 is free to move upwards to approximately the same position relative to body member 14 which pull-rod 58 was in when contact pads 8 and 12 were fully retracted into body member 14. As traveling block 76 moves toward the distal end of body member 14, spring 66 acts upon piston 54, causing piston 54 and attached pull rod 58 to simultaneously move toward the distal end of body member 14. The downward movement of piston 54 causes drive link 34, working through coupling links 36 and 37, to act upon crank arms 18 and 22, causing them to rotate around fulcrums 30 and 46, respectively, and to thereby generally laterally move contact pads 8 and 12 away from body member 14. It will be appreciated that the downward movement of piston 54 and pull rod 58 is limited by the extent to which the diametrical confines of borehole 4 will allow crank arms 18 and 22 and attached contact pads 8 and 12 to be extended relative to body member 14. Thus, when traveling block 76 has been moved to the lower position, the movement of piston 54 and pull rod 58, within the limits of the extremes established by the coincidence of the dimensions of cavity 78 and apertures 77a and 77b in traveling block 76 and apertures 79a and 79b in body member 14, is determined solely by the degree of lateral extension of crank arms 18 and 22, and attached contact pads 8 and 12, which borehole 4 will allow. As described earlier herein, potentiometer 84, attached in fixed relation to pull rod 58, provides an electrically determinable parameter indicative of the longitudinal position of pull rod 58 and therefore functionally indicative of the diameter of borehole 4 as such diameter is reflected by the extension of pads 8 and 12. Due to the constant pressure exerted by spring 66 on piston 54 and the freely pivotal attachments of each crank arm 18 and 22 and of drive link 34, each contact pad 8 and 12 is free to move independently to follow the contours of borehole sidewalls 10. So long as the lateral extension between contact pads 8 and 12 remains constant, drive link 34 will merely pivot relative to piston 54. Should the borehole contour allow one crank arm to extend, thereby altering the lateral extension between the contact pads 8 and 12, the force exerted through piston 54 on the other crank arm will cause drive link 34 to pivot relative to piston 54 as such extension occurs. Simultaneously, piston 54 will move longitudinally within body member 14 and such movement will be indicated by the signal from potentiometer 84.

Referring now particularly to FIGS. 1 A–C, 3 and 5, in the illustrated embodiment of the invention, body member 14 is held to one side of borehole 4 by pressure pad 12 while logging pad 8 is allowed to follow washouts or anomalies in that side of borehole 4. As discussed earlier herein, this is accomplished by an imbalance in the forces acting to extend crank arms 18 and 22 attached to contact pads 8 and 12. As the invention is illustrated, with a large logging pad 8 of the type commonly used in density logging operations, the mass of this logging pad 8 is sufficient to cause the described imbalance. As equal force is applied to extend each crank arm 18 and 22 from drive link 34 by means of coupling links 36 and 37, the mass of logging pad 8 causes logging pad crank-arm 18 to resist this extension, creating the imbalance and resulting in the effects described earlier. An imbalance of crank arm forces can be achieved through means other than through use of borehole-contacting pads of differing mass. An alteration in comparable dimensions of the two crank arm linkages will also yield a similar imbalance. For example, the same effect will occur if coupling links (elements 36 and 37 in the illustrations) of different lengths are used. Similarly, if the drive link (element 34 in the illustration) is pivotally attached to piston 54 at a point located non-equidistant between the pivotal attachment points of the coupling links, the extension forces exerted upon the crank arms will be unequal.

As is depicted in the Figures, as crank arm 18 and 22 move to maintain contact pads 8 and 12 in contact with borehole sidewalls 10, any change in the distance between the contact surfaces of logging pad 8 and pressure pad 12 will be reflected in a simultaneous change in the longitudinal position of piston 54 and pull rod 58 relative to body member 14, and will therefore be determinable by means of potentiometer 84. If the distance between the contact surfaces of contact pads 8 and 12 remains constant but the lateral extension of each individual contact pad 8 or 12 relative to body member 14 changes, drive link 34 merely pivots relative to piston 54 while piston 54 remains stationary.

Figure 6:
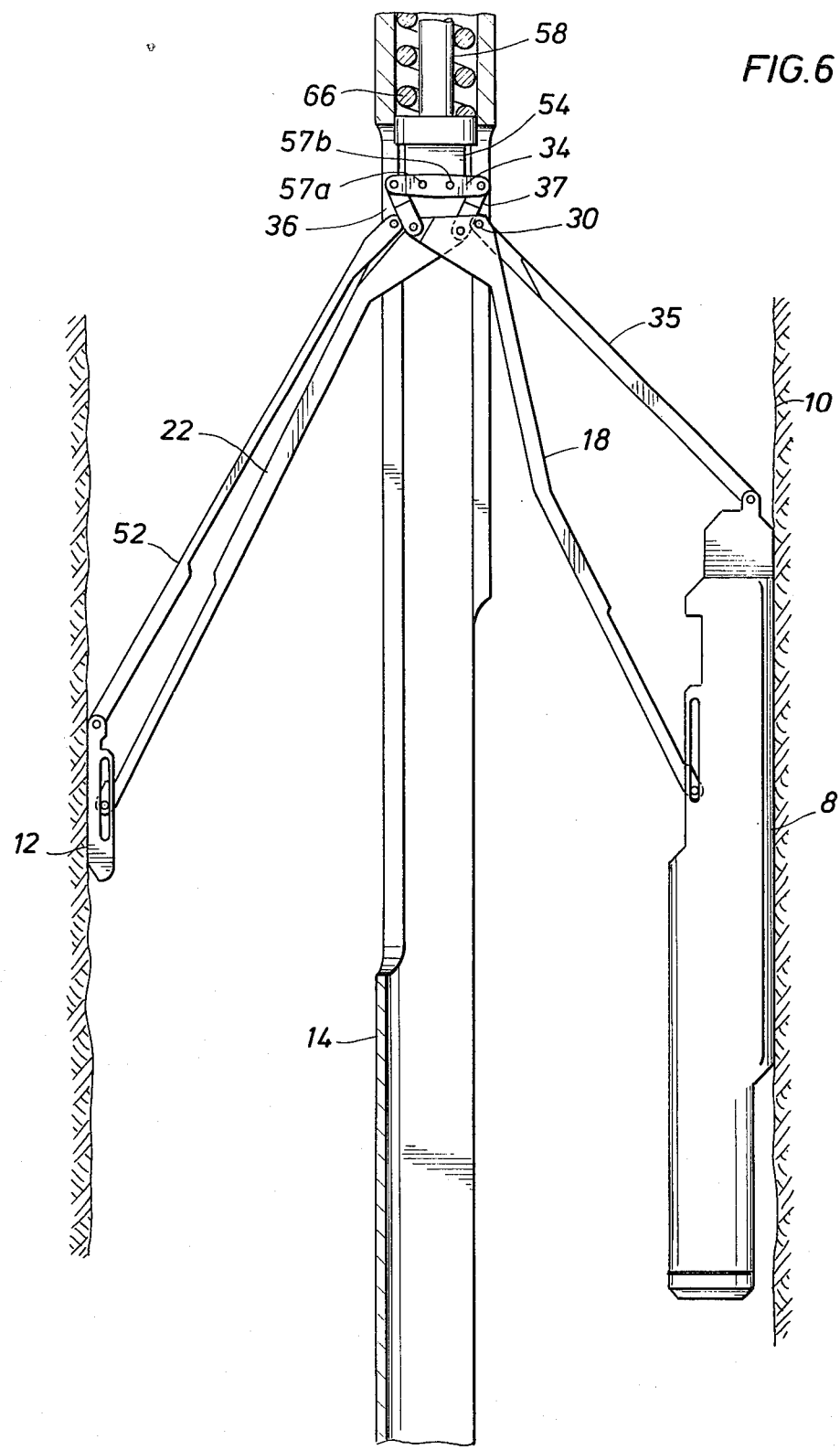
FIG. 6 illustrates the crank arm linkage of the instrument of FIG. 2 wherein the linkage is adapted to extend both crank arms simultaneously.

Referring now particularly to FIG. 6, it will be noted that in the event it is preferable that contact pads 8 and 12 move only in unison, such as if instrument 2 is to be run centralized within borehole 4, drive link 34 may be attached to piston 54 in a fixed, non-rotational relation, such as by use of pins 57a and 57b, so that any force exerted upon one borehole-contacting pad will be transferred through the crank arm linkage of that pad to piston 54 driving it upwards, thereby acting upon the opposing crank arm linkage and resulting in a corresponding movement in the opposing pad until such force is relieved. Instrument 2 will thus remain generally centralized within the dimension of the borehole 4 as determined at the depth of contact pads 8 and 12. It will also be appreciated that if contact pads of equal mass are utilized, and if comparable essential dimensions of each crank arm linkage are employed, then drive link 34 may be pivotally attached to piston 54 and instrument 2 will tend to remain generally centralized within borehole 4.

Referring to the Figures generally, at the conclusion of the logging operation, a second command signal is generated by the surface electronic circuitry (not illustrated) and communicated to instrument 2. This second command signal activates gear motor 98, causing it to rotate drive screw 82 in the reverse direction from that enabled earlier and to thereby cause drive screw 82 to move travelling block 76 toward the proximal or upper end of body member 14. This movement will be for a pre-determined distance as established by limitation mechanism 93, as discussed earlier herein, and is preferably of such a distance as will allow logging pad 8 and pressure pad 12 to be fully retracted within body member 14.

Figure 7:
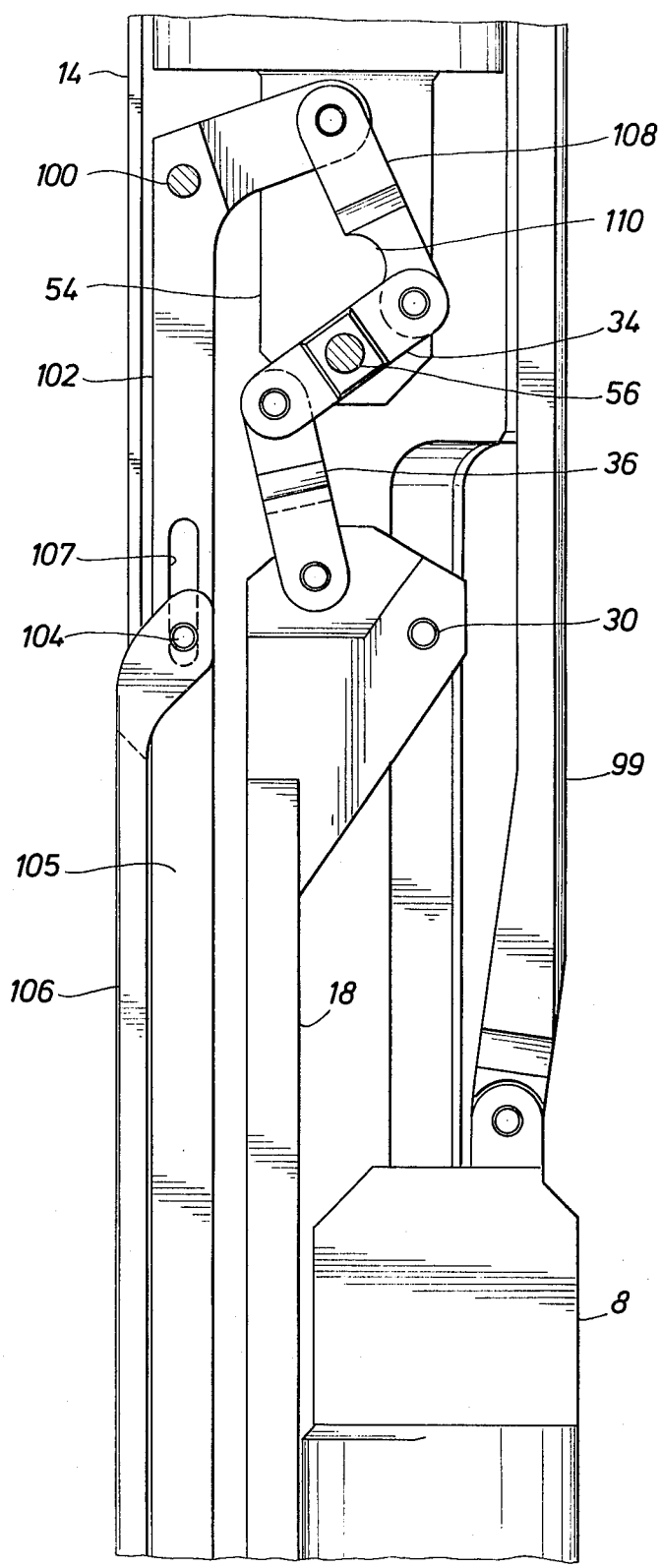
FIG. 7 is a side view, partially in cross-section, of the drive linkage portion of an alternative embodiment of the independent arm mechanism of the present invention.

Referring now to FIG. 7 of the drawings, therein is illustrated an alternative embodiment of the linkage portion of the independent articulating arm mechanism of the present invention. Because the operation of this configuration of the linkage is essentially identical to that described for the previous embodiment, elements equivalent to those illustrated in the previous embodiment have been numbered similarly and only the essential differences between the two embodiments will be discussed herein. Logging pad support arm 99 is pivotally attached at its second end to body member 14 at a point (not illustrated) on body member 14 radially aligned but longitudinally above fulcrum 30 of logging pad crank arm 18. Fulcrum 100 of pressure pad crank arm 102 is pivotally attached to body member 14 at a point diametrically opposed but longitudinally above fulcrum 30 of logging pad crank arm 18. Pressure pad support arm 106 is pivotally and slidably attached to pressure pad crank arm 102 through a follower channel 107 in extending arm 105 of pressure pad crank arm 102 with which is engaged a guide pin 104 on pressure pad support arm 106. Due to the changed position of fulcrum 100 of pressure pad crank arm 102, drive link 34 lies between fulcrums 30 and 100 of crank arms 18 and 102. Drive link 34 is pivotally attached to crank arms 18 and 102 by means of coupling links 36 and 108. Coupling link 108, attached to pressure pad crank arm 102, contains an indention 110 formed to clear drive link pivot pin 56 so as to allow a greater range of movement for coupling link 108 thereby facilitating extension of pressure pad crank arm 102.

In the operation of this linkage, when the retraction mechanism (not illustrated) is released, and the spring (not illustrated) acts upon piston 54, causing it to move downward, in the manner discussed with relation to the previous embodiment, coupling links 36 and 108 will pivot relative to drive-link 34 allowing drive-link 34 to pivot relative to piston 54 until the forces exerted upon crank arms 18 and 102 are essentially balanced. Drive link 34, working through coupling links 36 and 108, will rotate crank arms 18 and 102 causing them to move outward to meet and follow the contours of borehole sidewalls 10 in a manner similar to that described for the previous embodiment.

Many modifications and variations besides those specifically mentioned may be made in the techniques and structures described herein and depicted in the accompanying drawings without departing substantially from the concept of the present invention. For example, a hydraulic system or other suitable device may be utilized as a drive/retraction mechanism rather that the gear motor and spring combination described herein. Further, as is evident by the two embodiments depicted, the physical relations of the pivotal attachment points of the linkage components may be varied without departing from the concept of the present invention. Accordingly, it should be understood that the forms of the invention described and illustrated herein are exemplary only and are not intended as limitations on the scope of the present invention.

The embodiments of the invention in which an exclusive property or privilege is claimed are defined as follows:

1. A well logging instrument for use in an earth borehole, comprising:
   an elongated body member adapted to traverse said borehole;
   a first crank arm pivotally attached intermediate the ends thereof to a first location on said body member;
   a second crank arm pivotally attached intermediate the ends thereof to a second location on said body member;
   a first contact pad adapted for contacting the sidewalls of said borehole, said first contact pad pivotally and slidably attached to a first end of said first crank arm;
   a second contact pad adapted for contacting the sidewalls of said borehole, said second contact pad pivotally and slidably attached to a first end of said second crank arm;
   a first support arm having a first end pivotally attached to said first contact pad and a second end pivotally attached to said first location on said body member;
   a second support arm having a first end pivotally attached to said second contact pad and a second end pivotally attached to said second location on said body member;
   a first coupling link having a first end pivotally attached to a second end of said first crank arm;
   a second coupling link having a first end pivotally attached to a second end of said second crank arm;
   a drive link pivotally attached proximate its ends to the second ends of said first and second coupling links;
   a piston attached to said drive link;
   drive means for causing said piston to move longitudinally within said body member whereby said first and second contact pads are generally laterally extended relative to aid body member; and
   retraction means for causing said piston to move longitudinally within said body member such that said first and second contact pads are generally laterally retracted relative to said body member.

2. The well logging instrument of claim 1, wherein said drive link is pivotally attached to said piston.

3. The well logging instrument of claim 1, wherein said first contact pad contains means for determining characteristics of formations proximate said borehole.

4. The well logging instrument of claim 1, further comprising means for functionally indicating the lateral extension of said first and second contact pads relative to one another.

5. The well logging instrument of claim 1, wherein said drive means comprises a spring adapted to bias said piston.

6. The well logging instrument of claim 1, wherein said retraction means comprises:
- an electric motor; and
- rotationally responsive means coupled to said motor for moving said piston longitudinally within said body member.

7. The well logging instrument of claim 1, further comprising a pressure compensating means for equalizing the pressure within at least a portion of said body member with the pressure within said borehole.

8. The well logging instrument of claim 7, wherein said pressure compensating means comprises:
- a fluid-filled chamber within said body member, said chamber housing at least a portion of said retraction means; and
- means for altering the internal volume of said chamber in response to said borehole pressure.

9. Apparatus for use in a borehole traversing subsurface formations, comprising:
- an elongated body adapted to traverse said borehole;
- a first crank arm member formed with an obtuse angle intermediate a first and a second end thereof, said first crank arm member being pivotally coupled proximate said first end thereof to a first location on said body member;
- a first support are member of a generally linear form, said first support arm member being pivotally coupled at a first end thereof to said first location on said body member;
- a first contact pad member for contacting the sidewalls of said borehole, said first contact pad member pivotally and slidably coupled to a second end of said first crank arm member and pivotally coupled at one end thereof to a second end of said first support arm member, said first contact pad member being a relatively large mass formation density measuring pad;
- a second crank arm member, said second crank arm member being pivotally coupled proximate a first end thereof to a second location on said body member;
- a second support arm member, said second support arm member being pivotally coupled at a first end thereof to said second location on said body member;
- a second contact pad member for contacting the sidewalls of said borehole, said second contact pad member pivotally and slidably coupled to a second end of said second crank arm member and pivotally coupled at one end thereof to a second end of said second support arm member, said second contact pad member being of substantially smaller mass than said first contact pad member;
- a piston member longitudinally slidable within said body member;
- a drive lnk attached proximate one end of said piston member;
- a first coupling link having a first end pivotally coupled to a first end of said drive link and a second end pivotally coupled to said first end of said first crank arm member;
- a second coupling link having a first end pivotally coupled to a second end of said drive link and a second end pivotally coupled to said first end of said second crank arm member; and a biasing member for exerting a longitudinal force on said piston member causing said first and said second contact pad members to extend generally laterally relative to said body member.

* * * * *

UNITED STATES PATENT AND TRADEMARK OFFICE
CERTIFICATE OF CORRECTION

PATENT NO. : 4,432,143
DATED : February 21, 1984
INVENTOR(S) : Keith A. Moriarty, Lowell R. Milligan It is certified that error appears in the above—identified patent and that said Letters Patent is hereby corrected as shown below:

In the claims:

Claim 9, line 33, "are" should read "arm".

Claim 9, column 12, line 25, "lnk" should read "link".

Signed and Sealed this

Seventeenth Day of July 1984

[SEAL]

Attest:

GERALD J. MOSSINGHOFF

Attesting Officer

Commissioner of Patents and Trademarks